United States Patent [19]

Kazmerski

[11] Patent Number: 4,942,299
[45] Date of Patent: Jul. 17, 1990

[54] METHOD AND APPARATUS FOR DIFFERENTIAL SPECTROSCOPIC ATOMIC-IMAGING USING SCANNING TUNNELING MICROSCOPY

[75] Inventor: Lawrence L. Kazmerski, Lakewood, Colo.

[73] Assignee: Midwest Research Institute, Kansas City, Mo.

[21] Appl. No.: 317,466

[22] Filed: Mar. 1, 1989

[51] Int. Cl.$^5$ .............................................. H01J 37/00
[52] U.S. Cl. ...................................... 250/306; 250/307
[58] Field of Search ...................... 250/306, 307, 423 F

[56] References Cited

U.S. PATENT DOCUMENTS

| 4,343,993 | 8/1982 | Binnig et al. | 250/306 |
| 4,668,865 | 5/1987 | Gimzewski et al. | 250/306 |
| 4,837,435 | 6/1989 | Sakuhara et al. | 250/306 |

FOREIGN PATENT DOCUMENTS

| 139240 | 6/1987 | Japan | 250/306 |

OTHER PUBLICATIONS

Abrektsen et al, "A Compact Scanning Tunneling Microscope with Thermal Compensation", J. Phys. E. Sci. Instrum., 22 (1989) 39–42.
J. Stroscio et al., Voltage–Dependent Scanning Tunneling Microscopy Imaging of Semiconductor Surfaces, J. Vac. Sci. Technol., Mar./Apr. 1988, pp. 499–507.
L. Kazmerski, Analysis and Characterization of Thin Films: A Tutorial, Solor Cells, vol. 24, 1988, pp. 387–418.
M. Cardillo, STM Studies of Molecular and Chemical Properties of Surfaces, Physics Today, Jan. 1989, pp. S.20–21.

*Primary Examiner*—Bruce C. Anderson
*Attorney, Agent, or Firm*—Ken Richardson

[57] ABSTRACT

A Method and apparatus for differential spectroscopic atomic-imaging is disclosed for spatial resolution and imaging for display not only individual atoms on a sample surface, but also bonding and the specific atomic species in such bond. The apparatus includes a scanning tunneling microscope (STM) that is modified to include photon biasing, preferably a tuneable laser, modulating electronic surface biasing for the sample, and temperature biasing, preferably a vibration-free refrigerated sample mounting stage. Computer control and data processing and visual display components are also included. The method includes modulating the electronic bias voltage with and without selected photon wavelengths and frequency biasing under a stabilizing (usually cold) bias temperature to detect bonding and specific atomic species in the bonds as the STM rasters the sample. This data is processed along with atomic spatial topography data obtained from the STM raster scan to create a real-time visual image of the atoms on the sample surface.

23 Claims, 7 Drawing Sheets

Legend:

Boron      Silicon      Hydrogen

FIG. 4

Legend:

Indium  Copper  Oxygen

METHOD AND APPARATUS FOR DIFFERENTIAL SPECTROSCOPIC ATOMIC-IMAGING USING SCANNING TUNNELING MICROSCOPY

CONTRACTUAL ORIGIN OF THE INVENTION

The United States Government has rights in this invention under Contract No. DE-AC02-83CH10093 between the U.S. Department of Energy and the Solar Energy Research Institute, a Division of Midwest Research Institute.

BACKGROUND OF THE INVENTION

1. Field of the Invention

This invention is generally related to microscopic analysis of structures and components of solid materials and more specifically to a method and apparatus for directly imaging and distinguishing among atomic species on the surface of a solid material.

2. Description of the Prior Art

It has been a long-time goal of scientists and researchers to be able to "see" or directly image individual atoms of a substance, particularly of a solid material, with enough resolution to not only spatially resolve their respective locations in relation to each other, but also to distinguish and identify exact atomic species and bonding characteristics on a real-time and a real-space basis. Prior to this invention, no such method or apparatus was capable of doing so.

The most primitive technique of analyzing materials used simple visual observation and the sense of touch. Optical microscopes provided much greater optical resolution for smaller particles and features; and various hardness comparisons and other physical, chemical, spectral, and electrical property analyses were developed to improve recognition of material characteristics. However, even with the best optical instruments, the limits of direct, optically enhanced, visual resolution were reached many years ago.

More sophisticated devices, such as electron microscopes, were developed to achieve better resolution of tiny particles or features, but vertical resolution is limited, and direct atomic imaging remained beyond the resolution limits of electron microscopes. Other devices, such as secondary ion mass spectroscopy (SIMS) and low-energy electron diffraction (LEED), have been developed with capabilities of resolving surface structures and distinguishing between atomic and molecular species present in the solid material. However, such materials detection and analysis devices do not provide real-space visual images of the individual atomic species in the material.

The introduction of scanning tunneling microscopy (STM) in the early 1980s has provided both the spatial resolution and the analytic capabilities to image atoms on surfaces of solid materials. U.S. Pat. No. 4,343,993, issued to G. Binning et al. in 1982, describes such STM apparatus, which is now available commercially from at least four manufacturers, including Microscience, Inc., of Norwell, Massachusetts; McAllister Technical Services of Berkeley, California; RHK Instruments of Rochester Hills, Michigan; and V. G. Instruments, of Danvers, Massachusetts. The article entitled "Analysis and Characterization of Thin Films: A Tutorial" by Lawrence L. Kazmerski, published in Vol. 24, pages 387–418 of Solar Cells, based on a paper presented at the 8th Photovoltaic Advanced Research and Development Project Review Meeting in Denver, Colorado, November 15–18, 1987, shows how such STM apparatus can be used to show the effects of hydrogen processing in borondoped silicon grain boundaries and to provide three-dimensional molecular imaging of a $CuInSe_2$ crystal surface. An even more recent article entitled "STM Studies of Molecular and Chemical Properties of Surfaces" by Mark J. Cardillo, published in the January 1989 issue of physics. Today shows similar three-dimensional STM images of a silicon crystal surface before and after reaction with $NH_3$, which are produced in simulations based on molecular orbital calculations and demonstrates a way that STM can provide a picture of the electron density of specific orbitals of surface molecules.

However, the above-described STM apparatus and analysis techniques still lack the ability to differentiate directly between individual atomic species present in an image or to indicate their bonding to other atoms. Therefore, those STM apparatus and techniques still have not fulfilled the goal of being able to directly image the individual, respective atomic species and their bonding that exist in the surface layer of a solid material on a real-time analysis basis.

SUMMARY OF THE INVENTION

Accordingly, it is a general object of the present invention to provide enhanced STM analysis capabilities by which actual surface atomic structures of solids can be imaged.

It is a more specific object of this invention to provide a method and apparatus with the ability to differentially and selectively image specific atomic species in the surface layer of a material and to indicate their bonding.

Another specific object of this invention is to provide a method and apparatus for directly imaging the individual atoms of a substance, including the identity of each atomic species, as well as their spatial locations with respect to each other, on a real-time and real-space basis in either two-dimensional or three-dimensional image depictions.

A further object of this invention is to provide a spectroscopic scanning tunneling microscope (SSTM) that has the ability to image all atomic species, including the lighter atomic species, such as hydrogen, helium, oxygen, and the like, as well as the bonding of such atomic species, in semiconductor host materials.

Still another object of the present invention is to provide a SSTM method and apparatus with the ability to perform analyses under a continuous wide range of temperature biasing conditions, from 10 to 400K with no vibration problems.

Additional objects, advantages, and novel features of the invention shall be set forth in part in the description that follows and in part will become apparent to those skilled in the art upon examination of the following or may be learned by the practice of the invention. The object and the advantages of the invention may be realized and attained by means of the instrumentalities and in combinations particularly pointed out in the appended claims.

To achieve the foregoing and other objects and in accordance with the purposes of the present invention, as embodied and broadly described herein, the method of this invention may comprise positioning an STM probe adjacent a sample of material, electronically biasing the material to produce a tunnel current, and photon biasing the material with a light having a wavelength and frequency that resonates with the wavefunction of an atomic species in the material. It is preferred that the electronic bias be a voltage bias between the surface of the material and the STM probe, and it is preferred that the voltage bias be modulated over a selected range such that density of state calculations from tunnel current and voltage bias relationships and rates of change can be used to determine bonding of atoms in the material. When such relationships with and without specific photon bias wavelengths are compared, the specific atomic species of the atoms involved in the bonding can be determined. Therefore, the method of this invention can utilize the STM rastering and spatial resolution capabilities along with the atomic species and bonding identification techniques described above to produce a visual topographic image of the atomic structure of the surface of the material, including visual identification of the specific atomic species present. Temperature biasing, normally cooling the material to very low temperatures, is also used to stabilize the atoms, particularly the lighter atoms, to get the desired differential detection and species resolution.

The apparatus of this invention can include STM apparatus modified to include photon biasing means, modulating surface voltage biasing means, and preferably also including temperature biasing means.

BRIEF DESCRIPTION OF THE DRAWINGS

The accompanying drawings, which are incorporated herein and form a part of the specification, illustrate preferred embodiments of the present invention, and together with the description, serve to explain the principles of the invention.

In the drawings.

DETAILED DESCRIPTION OF THE PREFERRED EMBODIMENT

Figure 1:
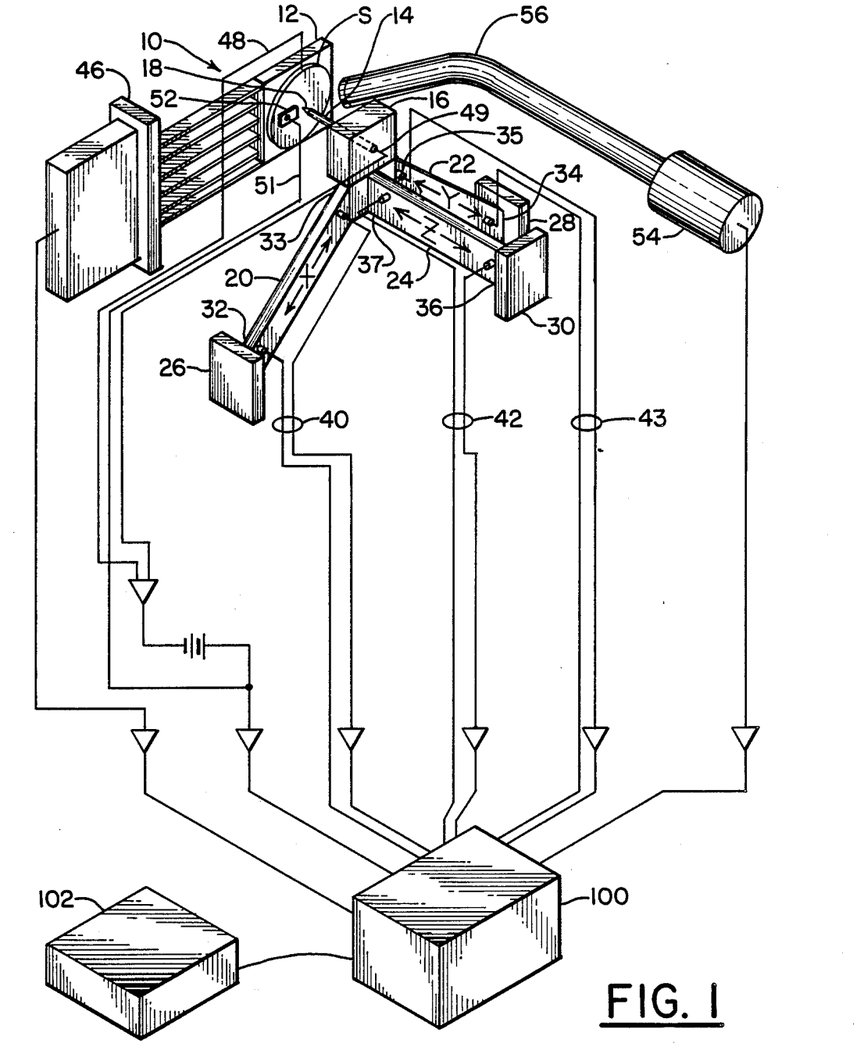
FIG. 1 is a schematic diagram in perspective of spectroscopic scanning tunneling microscope apparatus according to this invention.
Figure 2:
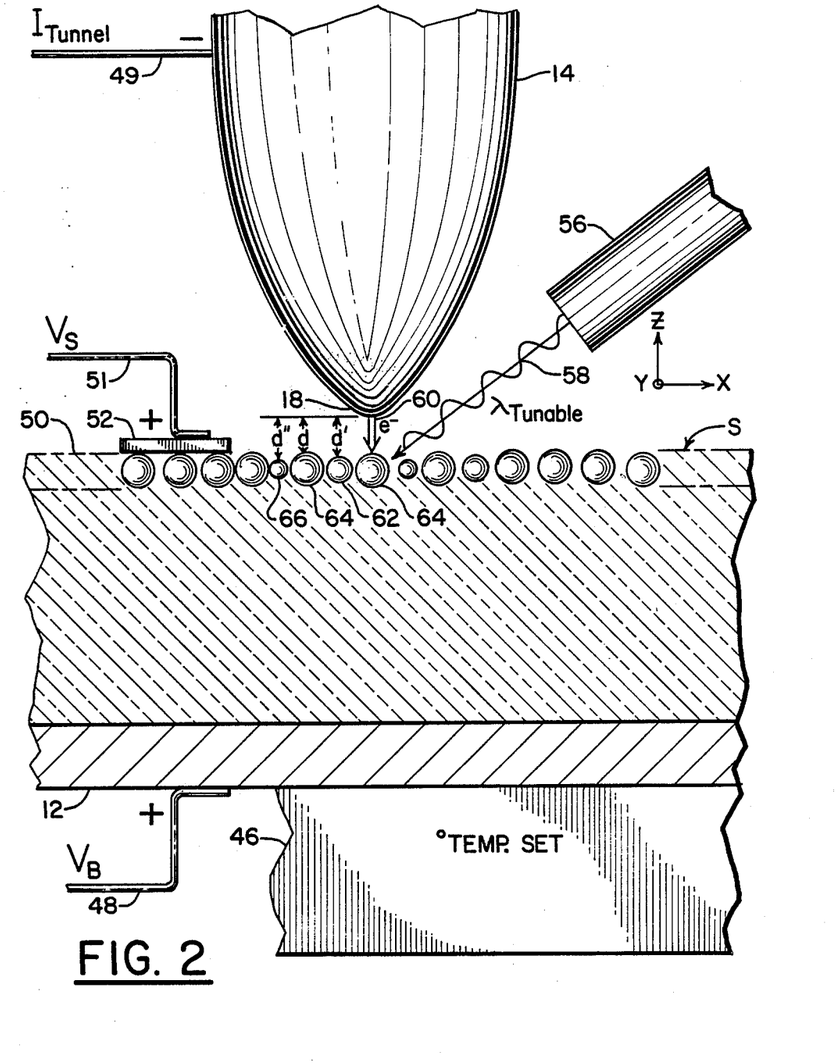
FIG. 2 is an enlarged schematic representation in elevation showing the electrical, photon, and temperature biases and the parameters output.

The spectroscopic scanning tunneling microscope (SSTM) according to the present invention is illustrated in schematic in FIGS. 1 and 2. It is essentially a scanning tunneling microscope (STM) similar to that described in U.S. Pat. No. 4,343,993, issued to G. Binnig et al. and which is available commercially from the companies listed in the background section above, with several significant modifications that will be discussed in more detail below. For purposes of assisting in the understanding of this invention, some of the rudimentary features of the STM systems will be described. However, a more detailed description of the structures and theories of operation of STM systems can be obtained from U.S. Pat. No. 4,343,993 or from any of the commercial manufactures listed in the background section of this application.

Essentially, the SSTM apparatus of this invention used the STM principles for the capability of mapping the atomic structure terrain on the surface of a solid material sample, such as a semiconductor, with sufficient resolution to determine the relative spatial locations of individual atoms with respect to each other. However, this invention adds the additional parameters of selected and tunable electrical, photon, and temperature biasing to distinguish specific atomic species and the atomic bonds between the atoms at each location.

As shown in FIG. 1, the SSTM apparatus 10 of the present invention includes a refrigerated cooling stage 12 for holding a sample material workpiece S to be studied. A pointed electrode or probe 14 is mounted in a block 16 such that the distal point 18 of the electrode probe 14 is positioned very close to, but not touching, the sample S.

Three orthogonal drives, such as piezoelectric elements 20, 22, and 24, are mounted and connected to the block 16 in such a manner as to move the electrode probe 14 in any of three orthogonal X, Y, and Z directions in relation to the sample S. As shown in FIG. 1, piezo drivers 20 and 22 are positioned to move the electrode probe 14 in the X and Y directions, respectively, which X and Y directions are preferably orthogonal to each other and parallel to the surface of the sample S. Piezo driver 24 is positioned to move the electrode probe 14 in the Z direction, which is orthogonal to both the X and Y directions and perpendicular to the surface of the sample S. Thus, the X and Y piezo drivers 20, and 22 can be used to raster the point 18 of the electrode probe 14 over the surface of the sample S, while the piezo driver 24 can be used to move the point 18 of the electrode probe 14 toward and away from the sample S.

The proximal end 32 of piezo driver 20 is anchored at 26 such that when an electric potential is applied across piezo driver 20, it strains and elongates longitudinally to move the distal end 33 and the electrode mounting block 16 in the X direction. Likewise, the proximal end 34 of piezo driver 22 is anchored at 28, such that application of an electric potential across piezo driver 22 causes it to strain longitudinally to move its distal end 35 and the electrode mounting block 16 in the Y direction. Similarly, with the proximal end 36 of piezo driver 24 anchored at 30, application of an electric potential across piezo driver 24 causes it to strain longitudinally to move its distal end 37 and electrode mounting block 16 in the Z direction. The electric potentials for the X, Y, and Z directions can be applied by computer control 100 to the piezo drivers 20, 22, and 24 through respective leads 40, 42, and 44. According to conventional STM technology, it is preferred that lateral X and Y and vertical Z direction movements be controllable in fractions of Angstrom units by the X, Y, and Z piezo drivers 20, 22, and 24 to obtain the desired microscopic spatial resolution necessary to image individual atoms.

Referring now to FIGS. 1 and 2 simultaneously, the temperature bias according to the present invention is preferably provided by a cooling stage 12 cooled by a Joule-Thompson type refrigerator 46, such as those manufactured by MMR Technologies, Inc., in Mountain View, California. Although this invention will work with other kinds of cooling systems, such as compressor or cryogenic systems, this Joule-Thompson type of refrigerator eliminates the need to provide vibration isolation from a compressor, which could be very detrimental to the extremely close required spatial tolerances if not eliminated, or to handle bothersome liquid cooling agents.

The temperature bias, which typically can be adjusted anywhere in the range of 10 to 400K or even down to about 4K if necessary, provides a stabilizing effect, particularly for lighter elements, such as those with atomic numbers below that of nitrogen. Critical or optimum temperatures for each specific element can be determined empirically. For example, it has been found that about 20K is optimum for hydrogen.

A base electric bias $V_B$, such as preferably 9 $V_S$ between the base 46 of the sample S and the electrode probe 14, can be set by leads 48 and 49 in a conventional STM manner. However, according to this invention, an additional surface electronic bias is also preferably accomplished by the application of an additional, separate electric potential $V_S$, between the tunneling electrode tip 18 and the sample surface 50. It is important that this surface electronic bias $V_S$ be applied to the sample surface 50, rather than the base bias $V_B$ of conventional STM, because, according to this invention, a specific electronic bias $V_S$ complemented with a specific, single wavelength photon bias can provide the basis for imaging and identifying the atomic species of any atom at the sample surface 50. However, the electronic bias $V_S$ must be exactly the potential between the sample surface 50 and the electrode probe tip 18; otherwise, the interrelationship between the photon bias and the electrical bias can lead to erroneous results, especially for contaminated samples. Therefore, an electrode contact 52 is preferably positioned on the sample surface 50 proximate the electrode probe 14, as shown in FIG. 1.

It is also preferred that this surface electronic bias $V_S$ be a controllable modulated signal for purposes described below. This modulated bias signal $V_S$ *can be controlled by computer* 100 *and applied by lead* 51 *and electrode contact* 52 *to the sample surface* 50, *and it will typically be in the range of plus or minus* 10 V, although most bonding elements of interest will require a positive voltage between 0 to 1.5 V.

The photon bias is preferably provided by a pulsed-tunable mode lock cavity laser system 54, although a chopped spectrometer using xenon light will also work. The laser system 54 is more expensive, but it provides the ability to tune the wavelength bias over a wider range to cover all the elements in the periodic table. The ability to tune and chop the bias light allows the system 10 to operate with the light on for definite, observable intervals at various desired wavelengths as well as off for definite, observable intervals, during which tunnel current is detected and recorded, as will be described in more detail below. An optical fiber light pipe 56 can be used to direct the photon bias light 58 to the sample S at the tip 18 of electrode 14.

In operation, the fine metal tip 18, usually an electrochemically prepared tungsten or platinum-rhodium, is brought within 3 to 10 Å of the surface 50 sample S to permit electron tunneling 60 between the tip 18 and the sample surface 50. The tunneling currents are typically on the order of 1 nA. At these extremely small distances, the wavefunctions of the atoms at the sample surface and on the fine probe overlap, and, by applying a bias voltage between them (usually in the range of 1 mV to 1 V), the electrons can tunnel from the probe tip 18 to the sample S (or vice versa). The tunneling is actually between a single atom on the electrode tip 18 and a single atom on the sample surface under desired conditions. As discussed above, the piezo drivers 20, 22, and 24 can move the tip 18 horizontally in the X and Y directions and vertically in the Z direction with respect to the surface 50.

Two common modes of operation are used. The first mode monitors changes in the tunnel current I to reflect changes in the distances between the tip 18 and the surface 50. Such distances d, d', and d" shown in FIG. 2 between the tip 18 and various atomic species, such as silicon 62, boron 64, and hydrogen 66, in the sample surface, can be measured in this manner. The second mode is more common and can be used to derive the same topographic information of the surface 50. In this second mode, variations in tunnel current I are monitored by a feedback circuit, which applies a feedback voltage to the vertical control piezo driver 24 in FIG. 1 to vary the distance so that a constant tunnel current I is maintained while scanning. This voltage correction is measured during the horizontal raster scan and presented as a real-space image of the surface 50 corrugations, providing a topographic replica. Lateral resolutions of about 1.7 Å and vertical resolutions of about 1.1 Å can be achieved. These data can further be processed to provide three-dimensional images of the atomic arrangements as has been previously reported in this art. The specific STM electronic control and monitor circuits discussed above are not shown in the drawings because they are available from the STM manufactures listed in the background above and are not necessary to describe this invention.

Figure 3:
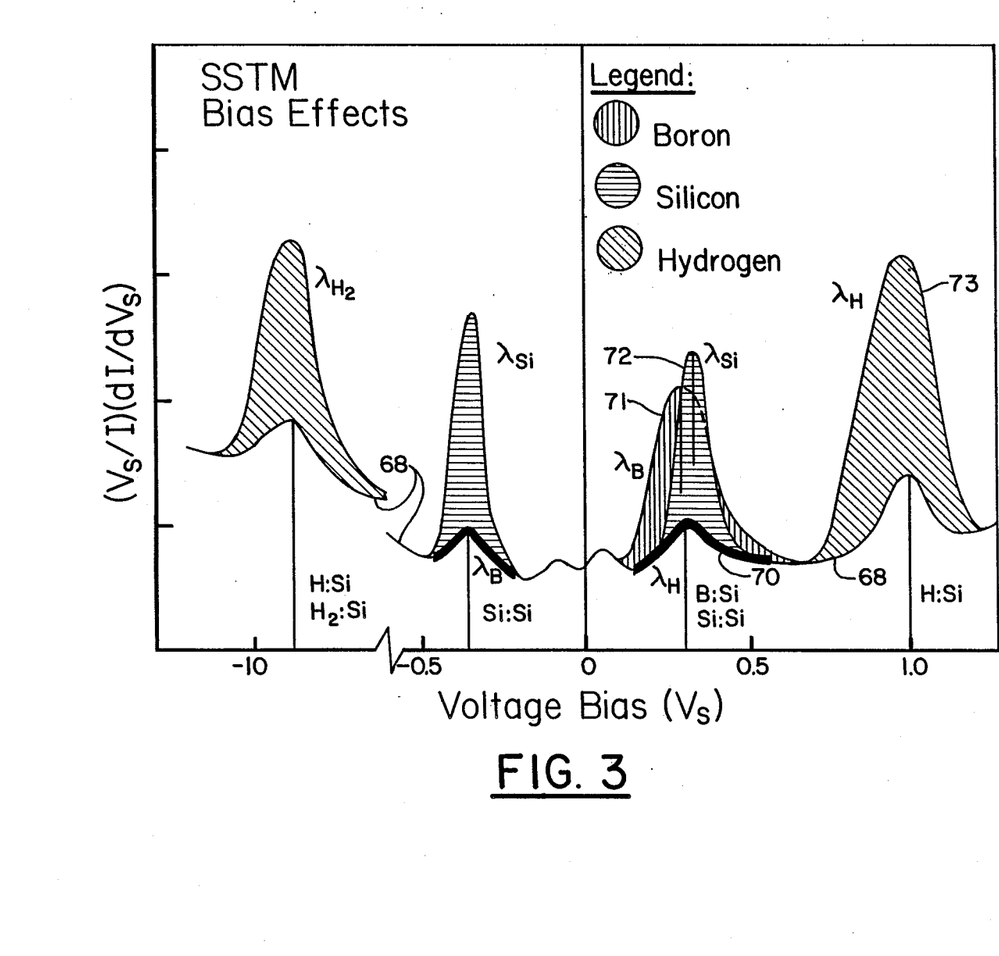
FIG. 3 is a graphical representation of the density of states, (V/I) (dI/dV), plotted versus voltage bias at various photon biases to indicate the bonds present at the selected probe locations.

Combining complementary electronic and photon biasing according to this invention with appropriate temperature biasing can also yield information about the bonding, as will as about the atomic species involved in the bonding. With the tip 18 positioned at a certain location over the surface 50, as shown in FIG. 2, the voltage bias $V_S$ between the tip 18 and the surface 50 is modulated over a selected range, such as between the range of about $-11$ to $+1.5$ V, as shown in FIG. 3. This modulated voltage bias $V_S$ is plotted as a curve 68 against a calculated factor defined as $(V_S/I)(dI/dV_S)$, which is indicative of the density of states, i.e., a true representation of the respective densities of the atoms present in the bonding at the tunneling location 60. The increased density-of-states value at certain bias voltages $V_S$ on the curve 68, such as at about $-9$ V, $-0.3$ V, $0.3$ V, and $1.0$ V, indicates that there are various atoms in bonding states at the location of the tunneling 60. However, this curve 68 by itself does not provide information to distinguish the specific atoms involved in the bonding, particularly where the density-of-states curve at a particular bias voltage $V_S$ can indicate the possibility of several kinds of atoms that can be bonding, i.e., where there may be lines or curves of specific atomic densities that are close or overlap on the FIG. 3 chart.

The information about the species of atoms involved in the bonding, thus, about the identity of specific atomic species at the location of the tunneling 60 under the tip 18, can be obtained by the addition of the photon biasing and then observing the voltage bias $V_S$ versus density-of-states curve 68 at the bonding indicators in FIG. 3. The most effective photon bias for the purposes of this invention is to provide light with a wavelength or frequency that matches the wavefunction of an atom present in the bond at the tunneling location. The wavefunction is a measure of the density of the atomic species. When such a match is obtained, the atom will resonate with the light, thus dramatically increasing the energy of the atomic wavefunction and resulting in a dramatic increase in the tunnel current. Therefore, the $dI/dV_S$ factor increases dramatically causing a large, very noticeable increase in the density-of-states value on the curve 68 at the bias voltage $V_S$ where bonding is indicated.

Actually, a selected photon bias is set on the surface 50 of the material sample S. The bias voltage $V_S$ is then modulated over a selected range. As the bias voltage $V_S$ nears an optimum for atomic species identification, particularly where there is an atomic species present with a wavefunction that resonates with the bias light, the tunneling current increases drastically. The computer 100 constantly monitors these inputs and calculates the $dI/dV_S$, which is the instantaneous change in tunnel current I per instantaneous change in bias voltage $V_S$. This $dI/dV_S$ value is multiplied by the value of $V_S/I$ to get the density-of-states value for the given instantaneous bias voltage $V_S$. These density of states values $V_S/I$) $(dI/dV_S)$ plotted against the bias voltage $V_S$ form the basis for the graph in FIG. 3 and for identifying specific atomic species in the material.

In the example of FIG. 3, the host lattice of the solid sample S is silicon (Si), and it is doped quite heavily with boron (B) atoms (approximately $10^{21}/cm^2$). Also, the sample S has been processed with hydrogen (H) for electrical neutralization of some shallow acceptors. Therefore, the sample S was also exposed to photon bias light having wavelengths or frequencies that correspond to the work functions of those respective atoms of Si, B, and H, for short, sequential intervals. This process can be programmed and controlled by the computer 100.

Essentially, the electronic biasing $V_S$ can be used to tune the curve 68 to the atoms in the bonding states. The photon biasing can then be used to differentiate which atomic species are present at the tunneling location where the respective curves 68 for each atomic species are very close or overlap under just electronic biasing with no photon biasing (e.g., to distinguish Si from Si:Si and B from Si:B). In other words, the electronic bias provides the spectroscopic information on the bonding, and the application of the light in each case distinguishes the atom involved in the bonding.

These distinguishing characteristics of the photon bias are illustrated in FIG. 3, which shows several photon biased curves superimposed over the non-photon biased curve 68 for contrast and comparison. All these photon biased curves for three different atomic species bonds would not necessarily show up from one tip 18 position, since there would not usually be all those atomic species present at one bonding location. However, they are combined on the graph in FIG. 3 for illustrative and comparative purposes.

For example, at about 0.3 V electronic bias $V_S$, a wavelength λH to match the resonant wavefunction of hydrogen, as shown by the heavy dark does not change or vary the density-of-states curve from the non-photon biased curve 68 at the same voltage bias $V_S$. However, when light with the wavelength λB of resonant boron wavefunction frequency is directed onto the tunneling area with the same 0.3 V electronic bias $V_S$, the density-of-states curve 71 increases dramatically over the non-photon biased curve 68 at the same voltage bias $V_S$. This dramatic increase of the density-of-states curve 71, illustrated with the area under the curve 71, indicates the presence of a boron atom in the bond.

At a slightly higher bias voltage $V_S$ of about 0.35 V, a photon bias with light having a wavelength λSi or frequency resonant with the wavefunction of silicon atoms produces a dramatically increased density-of-states curve 72 over the non-photon biased curve 68 at that same voltage bias which shows the presence of a silicon atom in the bond at that tunneling location. This silicon atom in the bond along with a boron atom identified as described above would show a B:Si bond. If the silicon atom showed alone in the silicon host in the absence of a showing of another atomic species at that bond location, it would indicate a Si:Si bond. The silicon is illustrated in FIG. 3 with the area under the curve 72.

At the bond presence shown by the rise in the density-of-states ($V_S/I$) $(dI/dV_S)$ $V_S$ electronic bias $V_S$ curve 68 at the range of $V_S$ of about 1.0 V, photon bias is tried again at the resonant frequency or wavelength λH of the hydrogen atom wavefunction. At the range of this 1.0 V bias $V_S$, the λH photon bias produces a dramatic increase in the density-of-states curve 73 over the non-photon biased density of states curve 68, thus showing the presence of a hydrogen atom in the bond at that bonding location. The area under curve 73 indicates the presence of hydrogen. When the presence of hydrogen is shown in the bond along with the presence of silicon, a H:Si bond is indicated. On the other hand, if only boron and hydrogen were shown at that bonding location, a H:B bond would be indicated. Actually, in the experiment from which this example was taken, hydrogen was shown to be bonded only with silicon and not with boron, which was the first time it had been actually shown that hydrogen processing to neutralize boron acceptors at grain boundaries in silicon semiconductors was really resulting in the hydrogen bonding with the silicon instead of with the boron. That experiment illustrates the capabilities of this invention.

It may be noted in FIG. 3 that the silicon atom's presence can also be shown by a λSi photon bias at about −0.3 V electronic bias $B_S$, and that the presence of hydrogen can also be shown by a λH2 photon bias at about −9 V electronic bias $V_S$. It may also be noted, however, that a λB photon bias at −0.3 V electronic bias did not produce an increase in the density-of-states curve 68.

The actual complementary electronic biases, photon biases, and temperature biases at which each atomic species can be shown in a bond can be determined empirically, and, once known, tables could be provided based on host lattices and giving the exact light, electronic, and temperature inputs to assist users in focusing onto specific atomic species of interest. For example, it has been determined empirically that the λB for boron is about 2424 Å, the λSi for silicon is about 3827 Å, and the λH for hydrogen is about 3132 Å or 2514 Å. Also, the λp for phosphorus is about 4468 Å, and the λAl for aluminum is 5898 Å. The temperature bias is not as critical, but it is preferably targeted to stabilize the lightest element, which, in the example above, is hydrogen. It has been found that optimum stabilization of hydrogen occurs at about 20 K. Also, as already shown in FIG. 3, the bonding for Si:Si and B:Si have been found to produce increased tunnel current I and increased $dI/dV_S$ slope of a current-voltage curve relationship or plot, thus a noticeable density-of-states increase at a surface-to-point electrode bias $V_S$ of about 0.3 V. A similar bonding indication for H:Si has been shown at about 1.0 V bias $V_S$. Thus, a person working with these elements in a silicon host matrix can tune directly to those electronic, photon, and temperature biases as he or she scans or rasters the surface with the electrode point 18 to "tune in" those atomic species. If the atomic species are not known, then a survey of simultaneous scanning of broad ranges of wavelengths and electronic biases $V_S$, possibly also with variations in temperature biasing, might be necessary to identify bonding sites and atomic species present in the material. Such survey scanning of broad ranges would, of course, take much longer than would targeted scans.

Figure 4:
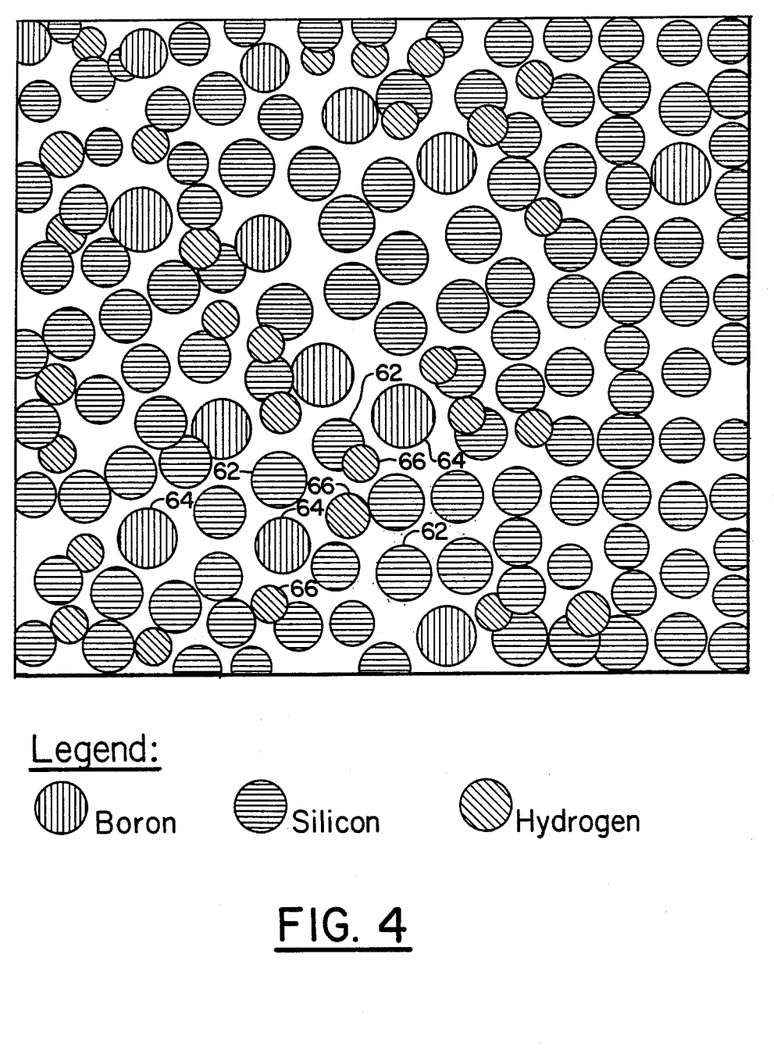
FIG. 4 is a two-dimensional representation produced by the SSTM of this invention of the existence and locations of three atomic species in a silicon host semiconductor with the silicon atoms, the boron atoms, and the hydrogen atoms represented in respectively different, distinctive symbolic hatching.

The SSTM apparatus of this invention can be controlled by a desktop computer 100, such as a Macintosh II ™ with a large RAM capacity. The data reduction can be accomplished by the same computer 100. The data can also be obtained, stored, and processed on a real-time and real-space basis during the raster over a selected surface area and then displayed in a composite visual representation of the atomic surface structure. Such a display of the sample in the experiment described in the example above produced on a plotter 102 (shown in FIG. 1) is shown in FIG. 4 with the boron atoms 64, the hydrogen atoms 66, and the silicon atoms 62 illustrated in respectively distinct hatchings to correspond with the hatchigs used in the FIG. 3 curves, although in practice these respective hatchings could be replaced by distinctive colors printed by a color plotter or the like. As shown in FIG. 4, the actual spatial locations as well as the specific atomic species identities of the various atoms present can be shown visually. The computer 100 can also be programmed to display the atoms in a three-dimensional depiction or in other formats.

Figure 5:
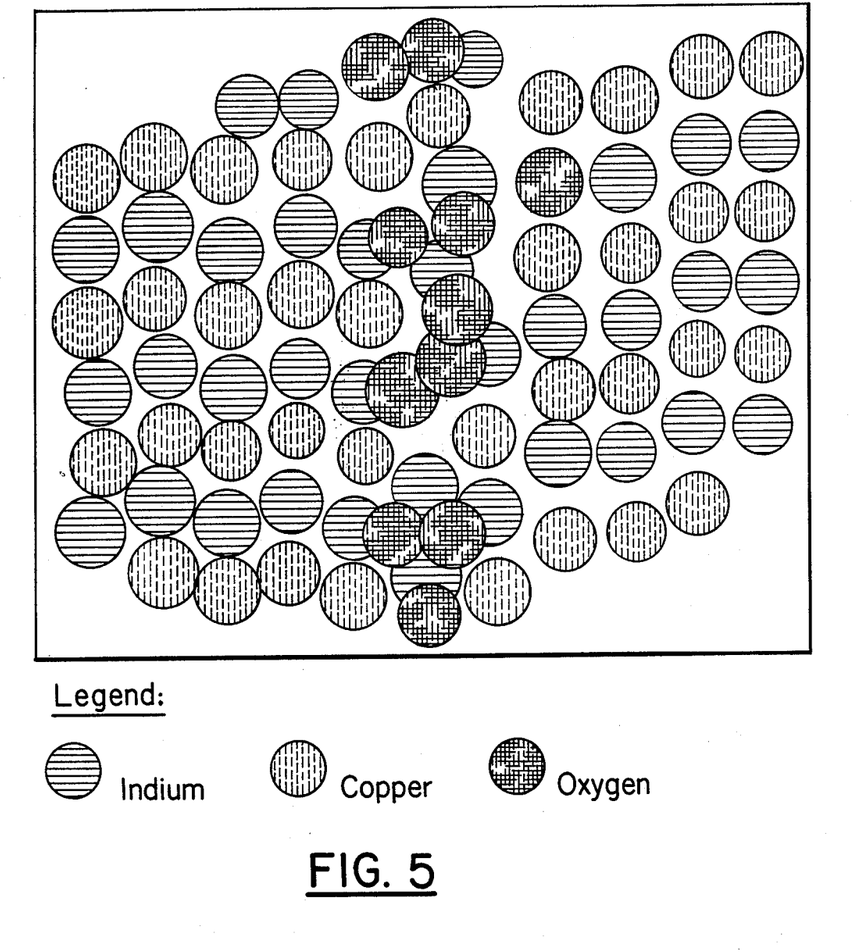
FIG. 5 is a two-dimensional representation produced by the SSTM of this invention of the existence and locations of a different three atomic species in an indium-selenium host lattice, showing the indium atoms, selenium, and oxygen in respectively different, distinctive symbolic hatching.

FIG. 5 illustrates another two-dimensional topographic view produced by the SSTM of this invention. In this FIG. 5 view, a lattic of In and Se is shown with oxygen penetrating the surface at a grain boundary.

Figure 6:
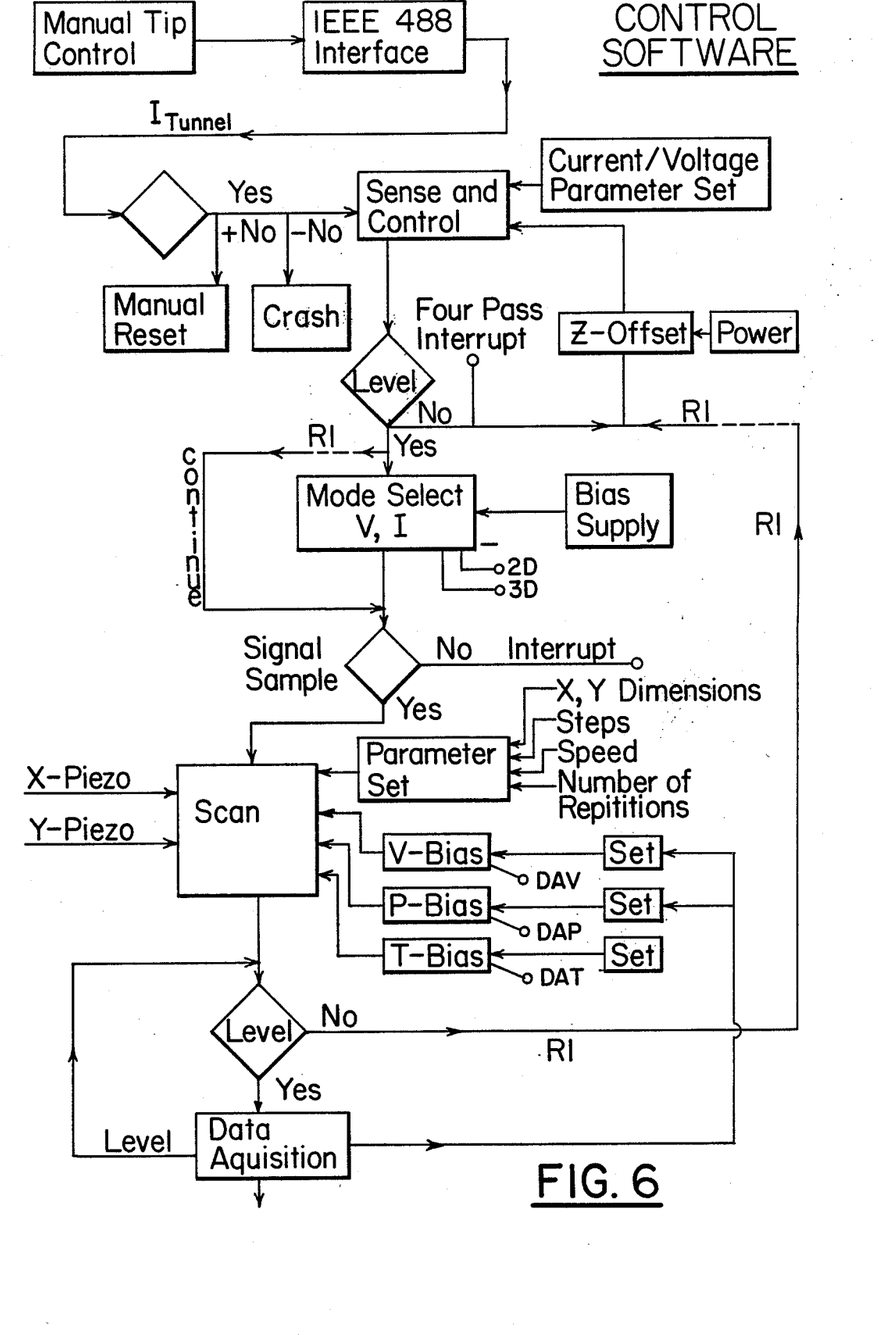
FIG. 6 is a schematic diagram of the control software used with this invention.
Figure 7:
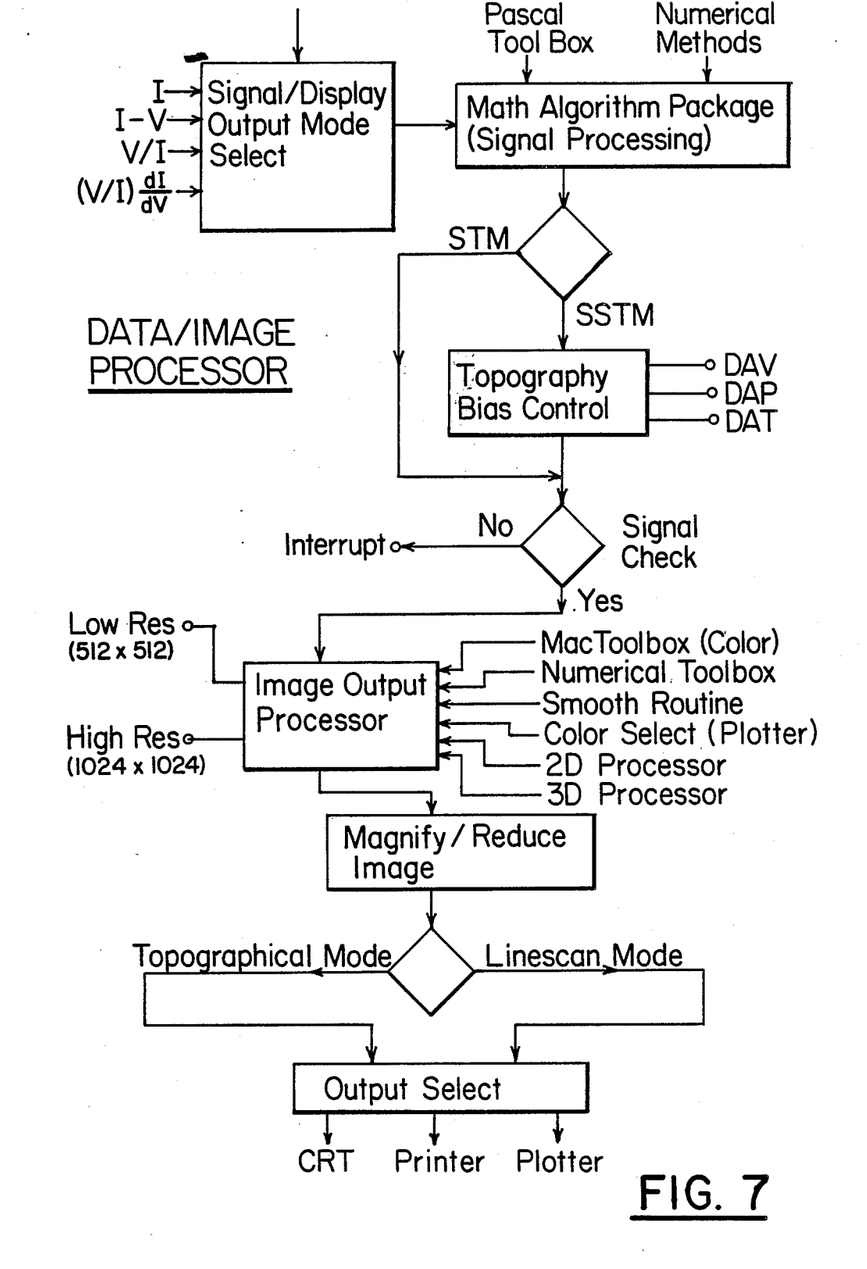
FIG. 7 is a schematic diagram of the data and image processing software used with this invention.

A flow diagram for an example control software for the SSTM of this invention is shown in FIG. 6. A flow diagram for data and image processing with a Macintosh II ™ computer is shown in FIG. 7. These programs can be readily understood by persons skilled in this art, and they are not claimed as the invention per se; therefore, they will not be described in greater detail herein.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalence may be restored to falling within the scope of the invention as defined by the claims which follow.

The embodiments of the invention in which an exclusive property or privilege is claimed are defined as follows:

1. A method of analyzing the surface of a material on a microscale basis, comprising the steps of:

positioning a fine-pointed electrode probe adjacent a surface of a sample of the material in close enough proximity to said surface that the respective WAVEFUNCTIONS of atoms in the material overlap with atoms in the electrode probe to accommodate tunneling of electrons, thus a tunneling current, from the electrode probe to the surface of the material;

positioning an electrode contact on said surface;

electronically biasing said surface of the material by application of an electrical potential between said electrode probe and said electrode contact;

photon biasing the material with light having a wavelength and frequency that resonates with the WAVEFUNCTION of an atomic species in the material; determining the magnitude of the tunneling current; and correlating the parameters of the tunneling current, the electronic surface bias voltage, and the photon bias wavelength, and comparing said correlations with empirically determined values of such parameters for known atomic species to ascertain the presence of a specific atomic species at the surface of the material.

2. The method of claim 1, including the step of temperature biasing the material to stabilize the atomic species in the material.

3. The method of claim 2, including the step of mounting the material on a Joule-Thompson type refrigerator stage for near vibration-free cooling of the material.

4. The method of claim 1, including the step of scanning the electronic bias over a selected voltage range.

5. The method of claim 4, including the step of scanning the photon bias over a selected range of wavelengths.

6. The method of claim 4, including the steps of setting the photon bias to selected wavelength values for each scan of the electronic bias over the selected voltage range, determining which wavelengths cause substantial incremental changes in tunnel current for associated incremental changes in bias voltage, and correlating those wavelengths with atomic species known to produce those effects at those wavelengths to determine the presence of those atomic species.

7. The method of claim 4, including the steps of setting the photon bias to selected wavelength values for each scan of the electroic bias over the selected voltage range, determining the $(V_S/I)(dI/dV_S)$ values in relation to the corresponding electronic bias values as a representation for the density of atoms present, where $V_S$ is the electronic voltage bias between the sample surface and the electrode probe, I is the tunneling current, and $dI/dV_S$ is the instantaneous change in tunnel current I per instantaneous change in voltage bias $V_S$, and correlating the selected wavelengths with increases in the density to determine the identities of atomic species present.

8. The method of claim 7, including the steps of rastering the fine-pointed electrode over the surface of the material, determining the identities of the atoms present on the surface of the material in spatial relation to each other corresponding to the respective raster positions of the electrode when each such atom is identified, and creating and displaying a visual image representation of each atom in its real-space spatial relation to the other atoms, including in the display a visual indication of each atomic species of the atoms in the display.

9. The method of claim 1, including the step of base-biasing the bulk of the material in relation to the fine-pointed electrode and maintaining this base bias to a constant value, and separately surface-biasing the surface of the material in relation to the fine-pointed electrode and modulating this surface biasing over a selected voltage range.

10. A method for selectively imaging atomic species present on the surface of a sample mounted in a scanning tunneling microscope (STM), comprising the steps of:

applying predetermined amounts of interrelated electronic and photon biasing on the surface of said sample to selectively effect the wavefunctions of individual atomic species in a manner that manifests in identifiable tunneling to bias voltage relationships that are, in conjunction with the current photon biasing, unique to individual atomic species;

identifying the individual atomic species by said uniquely identifiable photon bias and tunneling current to bias voltage relationship; and displaying an image of the atomic species in a manner that provides a visual identity of the atomic species.

11. The method of claim 10, including the steps of rastering an area of the surface of the sample with the STM in movement increments that are no larger than the diameters of individual atomic species, identifying the atomic species present at each raster increment, and displaying the individual atoms in the area rastered in real-space spatial relation to the other atoms present in the area in a manner that visually identifies the species of each atom displayed.

12. The method of claim 10, including the step of applying a cooling temperature bias to said sample to stabilize the atomic species sufficiently to obtain optimum identifiable tunneling current to bias voltage and photon bias relationships for the atomic species to be imaged.

13. The method of claim 12, including the steps of providing said electronic biasing with a highly stable and controllable DC power source, providing said photon biasing with a tunable wavelength laser, and providing said cooling temperature bias with a Joule-Thompson type, closed compressed gas refrigerator system that is essentially vibration free.

14. A method of analyzing and mapping the atomic topography and composition of a surface of a solid material, comprising the steps of:

placing the material in a rasterable STM with a fine-pointed electrode probe positioned sufficiently close to the surface of the material to cause electron tunneling from the electrode probe to the material when the wavefunctions of atoms in the material overlap with wavefunctions of atoms in the electrode, thereby resulting in a tunnel current I from the electrode probe to the surface of the material;

providing a voltage bias $V_S$ between the surface of the material and the electrode probe, modulating the voltage bias $V_S$ over a selected range, monitoring and calculating density-of-states in terms of $(V_S/I)(dI/dV_S)$ to determine spectroscopic information of the presence of bonding at the location of the tunneling, where $dI/dV_S$ is the instantaneous change in tunnel current I per instantaneous change in voltage bias $V_S$;

providing a photon bias of a wavelength and frequency that resonates with the wavefunction of an atomic species while modulating said voltage bias $V_S$, monitoring and calculating density-of-states values in terms of $(V_S/I)(dI/dV_S)$ under the photon bias and comparing these density-of-states values under photon bias to the density-of-states $(V_S/I)(dI/dV_S)$ values with no photon biasing at the same bias voltage $V_S$ ranges to determine the presence or absence of the atomic species in the bond by a substantial increase in the $(V_S/I)(dI/dV_S)$ values under the photon bias when the atomic species is present.

15. The method of claim 14, including the steps of providing another different photon bias of a wavelength and frequency that resonates with the wavefunction of another atomic species while modulating said voltage bias $V_S$, monitoring and calculating density-of-states values in terms of $(V_S/I)(dI/dV_S)$ under said different photon bias and comparing these density-of-states values under said different photon bias to the density-of-states $(V_S/I)(dI/dV_S)$ values with no photon biasing to determine the presence or absence of said another atomic species in the bond by a substantial increase in the $(V_S/I)(dI/dV_S)$ values under said another different photon bias when said another atomic species is present.

16. Spectroscopic scanning tunneling microscope (SSTM) apparatus for differential atomic imaging the surface of a material sample, comprising:

a mounting stage for mounting the sample;

a fine-pointed electrode probe positioned adjacent said mounting stage and being positionable very closely adjacent a sample that is mounted on said stage to accommodate a tunneling current between the sample and the probe;

tunable electronic surface bias means connected to the surface of the sample and to the probe for electronically biasing the surface of the sample in relation to the probe with a surface voltage bias;

photon bias means adjacent the stage for providing photon biasing of selected wavelengths and frequencies on the surface of the sample adjacent the probe;

instrumentation means for measuring tunneling current through the probe and electronic voltage bias;

data processing means connected to said instrumentation means and to said photon bias means for collecting, processing, and storing tunnel current, surface voltage bias, and photon bias data and for calculating and comparing tunnel current to voltage bias relationships in the presence and absence of photon biasing to determine atomic bonding and atomic species in the bonding; and display means connected to said data processing means for producing a visual display of atoms present in the surface of the material including a visually identifiable representation of the individual species of each atom.

17. The SSTM apparatus of claim 16, including raster means for rastering the probe in relation to the stage, said data processing means being connected to said raster means to control the raster movements and to collect and utilize spatial location data to map and display the atoms on the surface of the sample in real-space topographical relation to the other atoms on the surface.

18. The SSTM apparatus of claim 16, wherein said tunable electronic surface bias means includes modulating means for modulating the surface voltage bias over a selected voltage range and said data processing means is programmed to determine density-of-states of atoms at the location of the tunneling current in terms of $(V_S/I)(dI/dV_S)$, where $V_S$ is the surface voltage bias, I is the tunnel current, and $dI/dV_S$ is the instantaneous change in tunnel current I per instantaneous change in surface voltage bias $V_S$, and to compare the density-of-states under photon bias to the density-of-states at the same location not under photon bias in the same range of surface voltage vias.

19. The SSTM apparatus of claim 18, wherein said tunable electronic surface bias means includes an electric contact for mounting on the surface of the sample adjacent the probe.

20. The SSTM apparatus of claim 19, including base bias means for base biasing the bulk of the sample in relation to the probe and for holding said base bias constant while said surface bias is modulated.

21. The SSTM apparatus of claim 16, wherein said photon bias means includes a pulsed-tunable laser system.

22. The SSTM apparatus of claim 16, including temperature bias means for holding the temperature of the sample at selected temperatures.

23. The SSTM apparatus of claim 16, wherein the temperature bias means includes a Joule-Thompson type refrigerator for cooling the sample to any selected temperature in the range of 4 to 400 K without vibration.

* * * * *